(12) United States Patent
Bernardini

(10) Patent No.: US 12,728,991 B2
(45) Date of Patent: Sep. 8, 2026

(54) HUMAN-POWERED AIRCRAFT

(71) Applicant: COSTRUZIONI E SERVIZI S.R.L.S., Rome (IT)

(72) Inventor: Giuseppe Bernardini, Rome (IT)

(73) Assignee: COSTRUZIONI E SERVIZI S.R.L.S., Rome (IT)

( * ) Notice: Subject to any disclaimer, the term of this patent is extended or adjusted under 35 U.S.C. 154(b) by 0 days.

(21) Appl. No.: 19/106,176

(22) PCT Filed: Jul. 4, 2023

(86) PCT No.: PCT/IB2023/056925
§ 371 (c)(1),
(2) Date: Feb. 24, 2025

(87) PCT Pub. No.: WO2024/047413
PCT Pub. Date: Mar. 7, 2024

(65) Prior Publication Data

US 2026/0062122 A1 Mar. 5, 2026

(30) Foreign Application Priority Data

Aug. 31, 2022 (IT) ........................ 102022000017841

(51) Int. Cl.
*B64C 31/04* (2006.01)

(52) U.S. Cl.
CPC .................................... *B64C 31/04* (2013.01)

(58) Field of Classification Search
CPC ...................................................... B64C 31/04
See application file for complete search history.

(56) References Cited

U.S. PATENT DOCUMENTS 581,218 A * 4/1897 Myers ..................... B64C 31/04 244/64
2014/0239610 A1* 8/2014 Lasher, III ............. B62K 25/04 280/276

FOREIGN PATENT DOCUMENTS

CN 111776213 A * 10/2020 ............. B64C 33/00
CN 111907700 A * 11/2020 ............. F16H 37/02
(Continued)

OTHER PUBLICATIONS

European Patent Office, International Search Report issued in PCT/IB2023/056925, mailed Oct. 20, 2023, Rijswijk, NL.
(Continued)

*Primary Examiner* — Joshua D Huson
*Assistant Examiner* — Anna L. Gordon
(74) *Attorney, Agent, or Firm* — Ferguson Case Orr Paterson

(57) ABSTRACT

A human powered aircraft has a fuselage in which a nacelle is defined, at least one wing fastened to the fuselage, at least a first propeller adapted to rotate about a first propeller axis, and a propeller group configured to be operated by a user to rotate the at least a first propeller about the first propeller axis. The propeller group has a first propulsor and a second propulsor adapted to be moved by upper limbs and lower limbs of the user, respectively. The first and second propulsors are configured to be rotated alternatively in two opposite directions about a first rotation axis and a second rotation axis, respectively. At least one connection arm connects the first and second propulsors to each other so that a rotation in one direction of the first propulsor results in a rotation in the same direction of the second propulsor, and vice versa.

9 Claims, 3 Drawing Sheets

(56) References Cited

FOREIGN PATENT DOCUMENTS

| | | | | | |
|---|---|---|---|---|---|
| CN | 114044079 | A | * | 2/2022 | .............. B62M 1/30 |
| DE | 913856 | C | | 6/1954 | |
| FR | 504046 | A | | 6/1920 | |
| FR | 2628063 | A1 | | 9/1989 | |
| GB | 196043 | A | | 4/1923 | |
| WO | 2014045161 | | | 9/2013 | |
| WO | 2015025990 | A1 | | 2/2015 | |

OTHER PUBLICATIONS

European Patent Office, International Written Opinion issued in PCT/IB2023/056925, mailed Oct. 20, 2023.

* cited by examiner

HUMAN-POWERED AIRCRAFT

CROSS-REFERENCE TO RELATED APPLICATIONS

This application is a National Phase Application of PCT International Application No. PCT/IB2023/056925, having an International Filing Date of Jul. 4, 2023 which claims the benefit of priority to Italian Patent Application No. 102022000017841, filed Aug. 31, 2022, each of which is hereby incorporated by reference in its entirety.

FIELD OF THE INVENTION

The present invention relates to the technical field of human powered vehicles, and in particular is directed to a human powered aircraft.

BACKGROUND ART

To date, various known human powered aircraft have been developed and experimented, such as human powered airplanes. The development of such aircrafts has essentially occurred so far for sports and experimental purposes. In such human powered aircrafts, the propulsion energy required to move the aircraft is provided by a system of pedals operated by the lower limbs of a human being, as occurs in conventional bicycles.

However, the energy being thus transferred and therefore transformed into mechanical energy to be used for moving the aircraft is relatively limited with respect to the potential that a human being could express.

This is essentially due to two reasons. On the one hand, conventional pedaling applied by the feet alone only takes advantage of a part of the body muscles, and therefore of the user's potential capabilities.

On the other hand, the mechanical system for transforming muscle energy into mechanical energy, i.e., the pedal-crankarm system, is not particularly efficient since it must comply with structural limitations due to the dimensions and relationship thereof with the dimensions of human lower limbs.

In other words, since the crankarms of the pedals must be of a given length to be moved by the legs, increased efforts are required in order to apply significant forces, and therefore to develop significant powers.

A human pedal-powered aircraft is described, for example, in Patent Application W02015/025990 A1. In such a vehicle, the energy developed by a user when pedaling is used to operate a propeller.

The inventor designated in the present patent application previously conceived and developed human powered ground vehicles allowing a user to transmit to the driving wheels a much higher power than the power developed by pedaling. In such ground vehicles, the mechanical energy required for the propulsion is developed employing both lower limbs and upper limbs. Examples of such vehicles are described in Patent Application No. WO 2014/045161 A1.

SUMMARY OF THE INVENTION

It is a general object of the present invention to provide a human powered aircraft which allows providing at least one aircraft propeller with much higher power than that developable by a user pedaling with his/her lower limbs alone.

The aforesaid object, as well as other objects which will become more apparent hereinbelow, are achieved by a human powered aircraft as described and claimed herein. Preferred and advantageous embodiments of the human powered aircraft are also described.

The invention will be better understood from the following detailed description of particular embodiments thereof given by way of a non-limiting example with reference to the accompanying drawings briefly described in the following paragraph and in which equal or similar elements are indicated by the same reference signs.

DETAILED DESCRIPTION

Figure 1:
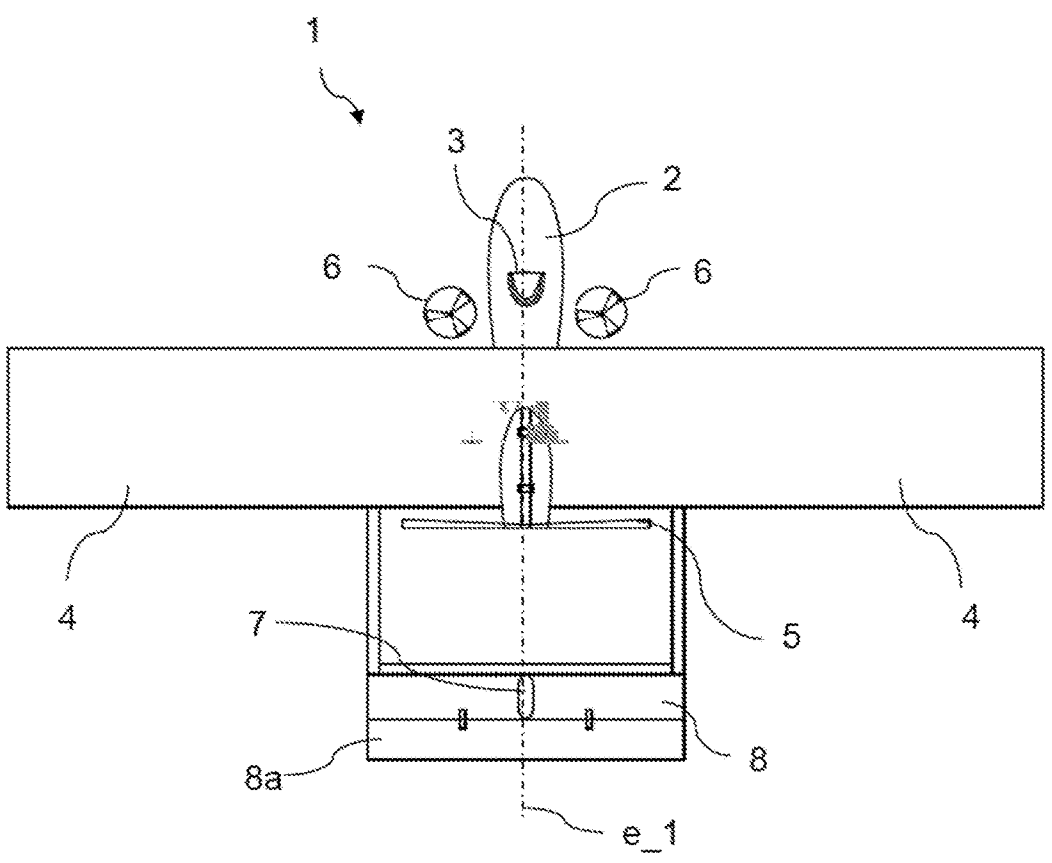
FIG. 1 shows a plan view of an exemplary and non-limiting embodiment of a human powered aircraft, comprising a fuselage, a wing, a main propeller, two auxiliary propellers, and a stabilizer-rudder assembly.
Figure 2:
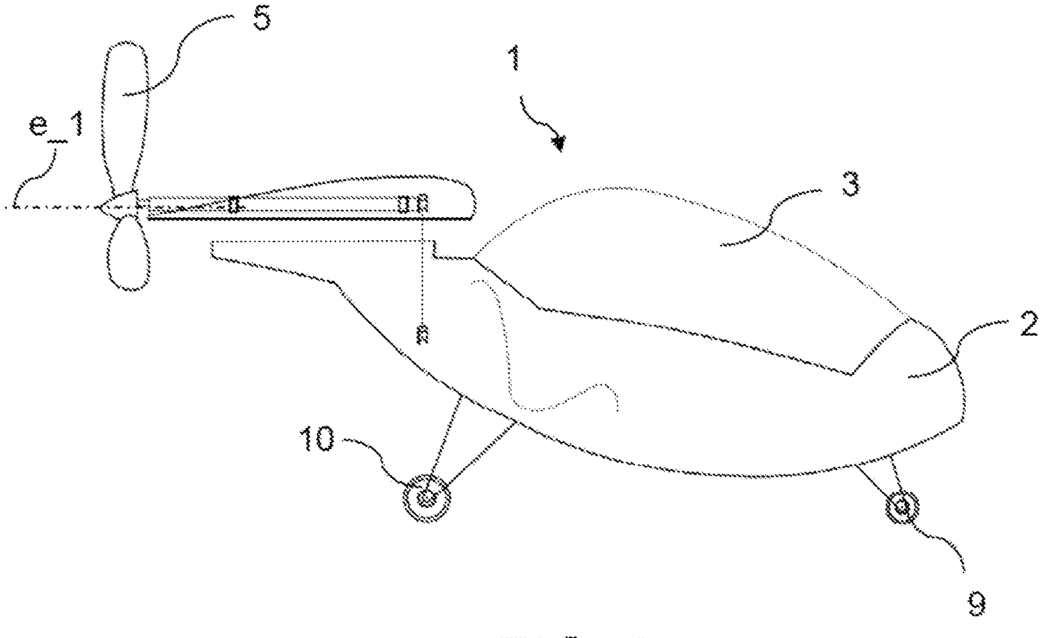
FIG. 2 shows a side view of the aircraft in FIG. 1, from which the auxiliary propellers and the stabilizer-rudder assembly have been removed.
Figure 3:
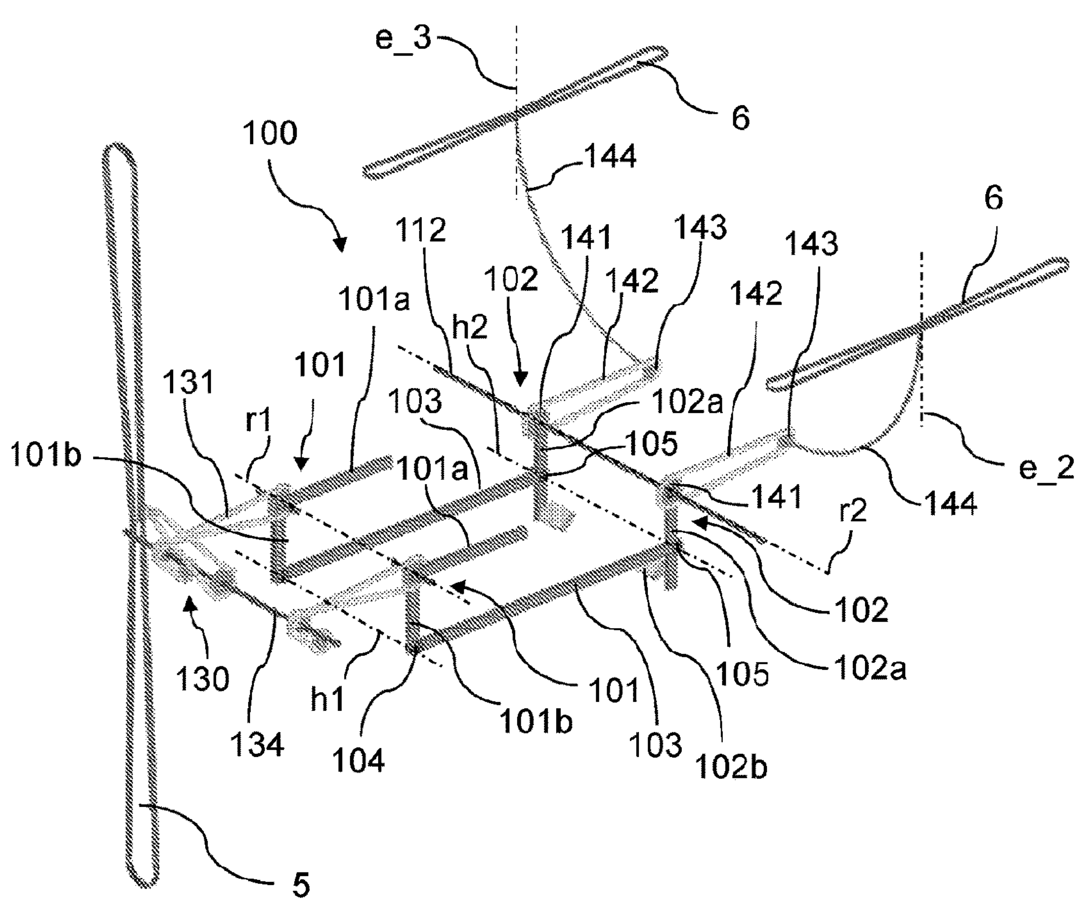
FIG. 3 shows an isometric diagrammatic view of a non-limiting embodiment of a propeller group of the aircraft in FIG. 1.
Figure 4:
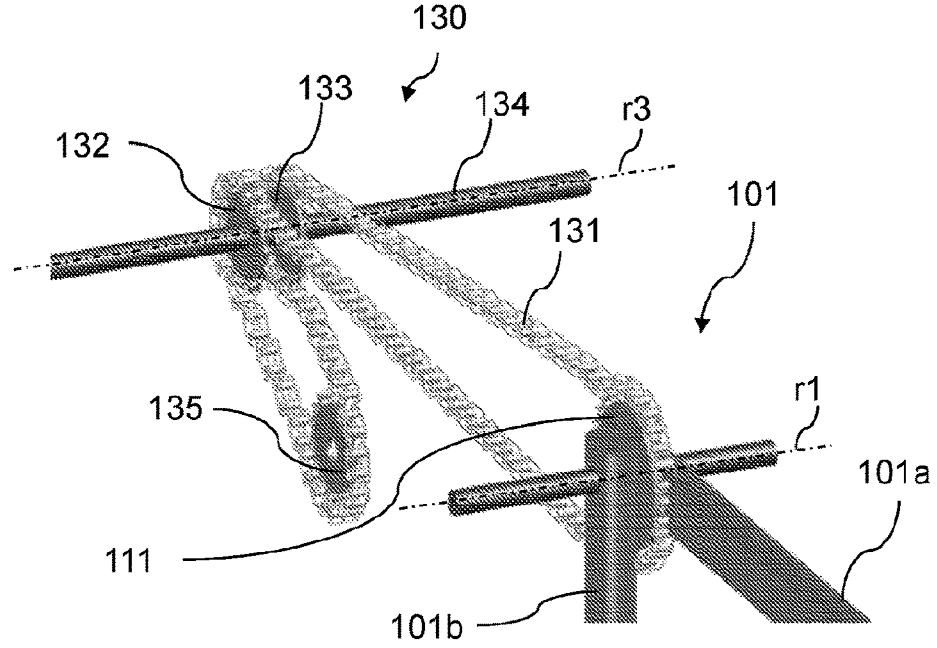
FIG. 4 shows an isometric view of a first enlarged part of the propeller group in FIG. 3.
Figure 5:
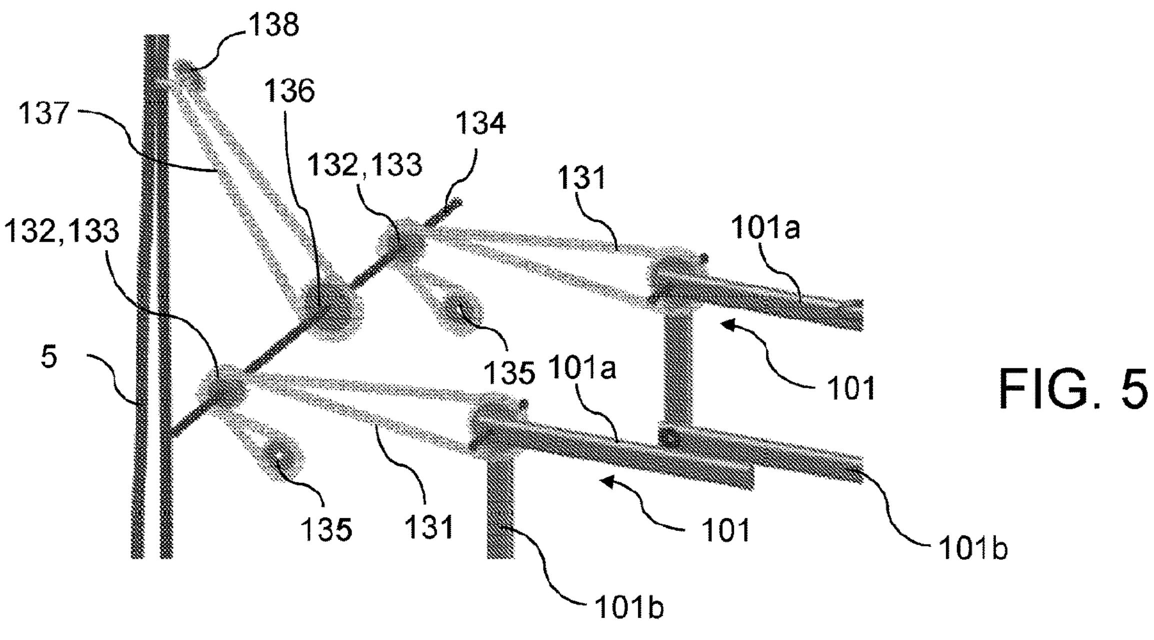
FIG. 5 shows an isometric view of a second enlarged part of the propeller group in FIG. 3.

FIG. 1 shows an exemplary non-limiting embodiment of a human powered aircraft 1, which can also be referred to as "aircraft 1" in brief in the present description. The human powered aircraft 1 preferably is an airplane, e.g., an ultra-light aircraft.

Aircraft 1 comprises a fuselage 2 in which a nacelle 3 is defined. Fuselage 2 is conveniently made of carbon fiber. A seat for accommodating a user, in particular a pilot, is defined in the nacelle 3.

The human powered aircraft 1 comprises at least one wing 4 fastened to fuselage 2. In the particular example shown in FIG. 1, wing 4 is a single continuous wing, e.g., having an extension of about 15 m, for example of 14 m. In an alternative embodiment, wing 4 comprises two separate wings.

The human powered aircraft 1 further comprises at least a first propeller 5 adapted to be moved to rotate about a first propeller axis e_1 which preferably is a horizontal, or substantially horizontal, axis when the human powered aircraft 1 rests on the ground or glides parallel to the ground. According to a preferred embodiment, the first propeller 5 has a length between 2.4 and 3.0 m, and for example of 2.6 m. According to an advantageous embodiment, the first propeller 5 is a two blade propeller. For example, each of the blades has a length of 1.3 m.

According to an advantageous embodiment, the first propeller 5 is a main propeller and the human powered aircraft 1 further comprises at least one auxiliary propeller 6 adapted to be moved to rotate about a further propeller axis e_2, e_3 perpendicular, or substantially perpendicular, to the first propeller axis e_1, e.g., a generally vertical propeller axis e_2, e_3. Advantageously, the at least one auxiliary propeller 6 has smaller dimensions than the main propeller

5. For example, the auxiliary propeller 6 has a length which is less than half the length of the main propeller 5. For example, if the main propeller 5 has a length of 2.6 m, the auxiliary propeller 6 has a length of 1.0 m. According to an embodiment, the auxiliary propeller 6 is a two blade propeller.

Preferably, the human powered aircraft 1 comprises two auxiliary propellers 6 mutually arranged on opposite sides with respect to fuselage 2, each of which is adapted to be rotated about a respective propeller axis e_2, e_3 perpendicular, or substantially perpendicular, to the first propeller axis e_1. The two propeller axes e_2, e_3 preferably are parallel, or substantially parallel, to each other.

According to a particularly advantageous embodiment, the at least one auxiliary propeller 6 can be rotationally operated by a user during take-off to promote the lifting of aircraft 1 from the ground and/or during landing to allow a more gradual descent of aircraft 1 towards the ground. Additionally or alternatively, the at least one auxiliary propeller 6 is operable by the user to adjust the inclination of the aircraft 1 with respect to the ground during take-off and/or landing. Preferably, the at least one auxiliary propeller 6 is not rotationally operated by human driving thrust when the aircraft 1 is in an operating condition of gliding at a constant altitude.

The human powered aircraft 1 preferably comprises a rudder-stabilizer assembly 7, 8 fastened to fuselage 2 and comprising a rudder 7 and a stabilizer 8. Conveniently, the stabilizer 8 comprises an elevator 8*a*.

Preferably, the human powered aircraft 1 further comprises one or more wheels 9, 10 constrained to fuselage 2. For example, aircraft 1 comprises at least one front wheel 9 and at least one rear wheel 10, preferably two parallel rear wheels 10 axially spaced apart from each other. As known per se, the wheels 9, 10 are used during take-off and during landing of aircraft 1 and are preferably equipped with respective braking devices.

The human powered aircraft 1 comprises a propeller group 100 adapted and configured to be operated by a user to rotate the at least a first propeller 5 about the first propeller axis e_1.

The propeller group 100 comprises first propulsion means 101 adapted to be moved by the user by means of his/her upper limbs, and second propulsion means 102 adapted to be moved by the user by means of his/her lower limbs. The first propulsion means 101 are configured to be alternatively rotated in two opposite directions about a first rotation axis r1. The second propulsion means 102 are configured to be alternatively rotated in two opposite directions about a second rotation axis r2. Conveniently, the first rotation axis r1 and the second rotation axis r2 are parallel rotation axes. The propeller group 100 can comprise end-of-stroke means adapted to limit the rotation angles of the first propulsion means 101 and the second propulsion means 102. For example, the angular stroke of the first propulsion means can be limited to an angle between 30° and 120°, e.g., between 60° and 90°.

The propeller group 100 comprises at least one connection arm 103 which connects the first propulsion means 101 and the second propulsion means 102 to each other so that a rotation in one direction of the first propulsion means 101 results in a rotation in the same direction of the second propulsion means 102, and vice versa.

According to an advantageous embodiment, the at least one connection arm 103 comprises a rod, preferably a rigid rod, which is rotatably hinged to the first propulsion means 101 and the second propulsion means 102 in two hinge points 104, 105, respectively, which are spaced apart from each other. The aforesaid hinge points 104, 105 identify a first hinge axis h1 and a second hinge axis h2, respectively, which are preferably parallel to each other and parallel to the first rotation axis r1 and the second rotation axis r2. The hinge points 104, 105, and therefore the respective hinge axes h1, h2, alternatively rotate about the first rotation axis r1 and the second rotation axis r2, respectively, during the operation of the propeller group 100. The first rotation axis r1 and the second rotation axis r2 are instead fixed axes, i.e., during the operation of the propeller group 100, such rotation axes r1, r2 have a fixed position with respect to the fuselage 2 of aircraft 1.

For example, the connection arm 103 comprises a first end portion rotatably connected to the first propulsion means 101 and a second end portion, opposite to the first end portion, rotatably connected to the second propulsion means 102.

According to the embodiment shown in the figures, the connection arm 103 is a straight rod but in alternative embodiment, it could be a curved rod. In particular, the expedient of using a curved rod allows reducing the vertical volumes of at least one portion of the propeller group 100, e.g., allowing the first hinge axis h1 to be positioned at a higher height than the second hinge axis h2.

According to an advantageous embodiment, the first propulsion means 101 comprise at least one rotatable lever 101*a*, 101*b* manually operable by the user. Conveniently, a free end of the rotatable lever 101*a*, 101*b* comprises an ergonomic handle (not shown in the figures).

According to an embodiment, the rotatable lever 101*a*, 101*b* comprises a first lever portion 101*a* and a second lever portion 101*b* which are mutually rotationally integral and mutually arranged so as to form an angle, e.g., an angle of, or of about, 90°. In such an embodiment, the rotatable lever 101*a*, 101*b* is thus an L-shaped, or substantially L-shaped, lever. In alternative embodiments, the rotatable lever 101*a*, 101*b* could be a curved lever, e.g., having two mutually integral lever portions 101*a*, 102*b* forming an elbow.

According to an embodiment, an end portion of the rotatable lever 101*a*, 101*b* is rotatably hinged to the connection arm 103 at the hinge point 104.

According to an advantageous embodiment, the first propulsion means 101 comprise at least a first driving wheel 111 fastened to the rotatable lever 101*a*, 102*b* and integral with such a rotatable lever 101*a*, 101*b* in the reciprocating rotating motion of lever 101*a*, 101*b* about the first rotation axis r1. If the rotatable lever 101*a*, 101*b* comprises two lever portions 101*a*, 101*b*, the first driving wheel 111 is advantageously arranged between the first lever portion 101*a* and the second lever portion 101*b*. For example, the first driving wheel 111 is axially interposed between the first lever portion 101*a* and the second lever portion 101*b*. According to a possible embodiment, the first driving wheel 111 comprises two axially opposite circular faces, and the first lever portion 101*a* and the second lever portion 101*b* are each fastened, e.g., welded, to a respective circular face of the first driving wheel 101. The first driving wheel 111 conveniently is a gear wheel.

In the particular embodiment shown in the figures, the first propulsion means 101 comprise two rotatable levers 101*a*, 101*b* adapted and configured to be rotated by the user's right upper limb and left upper limb, respectively. In such an embodiment, the first propulsion means 101 further comprise two first driving wheels 111 axially spaced apart from each other, e.g., by a distance greater than 50 cm.

Advantageously, the two rotatable levers 101*a*, 101*b* are operable by a user independently of each other. Hence, in this embodiment, the two first driving wheels 111 also rotate independently of each other about the first rotation axis r1.

According to an embodiment, the second propulsion means 102 comprise at least one crankarm 102*a*. The crankarm 102*a* is configured to rotate in a reciprocating manner about the second rotation axis r2 and is rotatably hinged at the hinge point 105 to the connection arm 103. For example, the crankarm 102*a* has a first end portion hinged about the second rotation axis r2, a free second end portion which is opposite to the first end portion. A pedal 102*b* is preferably fastened on the free end portion of crankarm 102*a*. The hinge point 105 at which the crankarm 102*a* is hinged to the connection arm 103 is an intermediate point of crankarm 102*a* arranged between the first and second end portions of the crankarm 102*a*.

By virtue of the connection arm 103, a rotation of crankarm 102*a* determines a rotation of the rotatable lever 101*a*, 101*b*, and therefore a rotation of the first driving wheel 111. The driving wheel 111 can thus be rotated by means of a human driving thrust applied to the rotatable lever 101*a*, 101*b* by the upper limbs and/or a human driving thrust applied to the crankarm 102*a* by the lower limbs.

In the particular embodiment shown in the figures, the second propulsion means 102 comprise two crankarms 102*a* adapted and configured to be rotated by the user's right lower limb and left lower limb, respectively. According to an advantageous embodiment, the two crankarms 102*a* are operable by a user independently of each other.

According to an embodiment, the propeller group 100 comprises a first motion transmission system 130 which allows converting a reciprocating rotary motion of the first propulsion means 101 and of the second propulsion means 102 into a continuous rotary motion of the first propeller 5 so that it always rotates in the same direction about the first propeller axis e_1. In particular, the first motion transmission system 130 allows converting the reciprocating rotary motion of the driving wheel(s) 111 to the first propeller 5 so that they always rotate in the same direction.

According to an advantageous embodiment, the first motion transmission system 130 comprises at least a first chain or belt 131 and at least a first driven wheel 132, 133. The first driven wheel 132, 133 preferably is a gear wheel. The first chain or belt 131 operatively connects the first driving wheel 111 to the first driven wheel 132, 133. Conveniently, the first transmission system 130 comprises a first driven shaft 134 which supports the first driven wheel 132, 133 and which is rotatable about a third rotation axis r3.

According to a particularly advantageous embodiment, the first driven wheel 132, 133 is or comprises an overrunning clutch. An overrunning clutch is a mechanism that allows the free rotation of the member on which it is mounted (in this case, the driven shaft 134) according to a rotation direction, while driving said member to rotate in the opposite direction. Such a mechanism is also known as a "freewheel". It is thus apparent how the reciprocating rotary movement of the first propulsion means 101 and the second propulsion means 102 is converted into a rotary motion in one direction alone of the driven shaft 134.

Since the rotation angle of the driving wheel 111 is limited upon the reciprocating rotary motion of the driving wheel 111, only a part of the belt or chain 131 is engaged with the teeth of driving wheel 111 and driven wheel 132, 133. For this reason, one or more segments of the chain or belt 131 could be, for example, in the shape of a cable, e.g., a metal cable, required to close a ring which is only partially formed by a chain or belt. Advantageously, a reduction of weights is thus achieved.

According to a particularly advantageous embodiment, the first driven wheel 132, 133 is a dual wheel comprising two freewheels operating in opposed rotary directions and the chain or belt 131 is a crossed chain which engages both said freewheels 132, 133. In other words, the two freewheels 132, 133 are configured so that when one of them rotates in a direction due to the rotation of the first propulsion means 101 and/or the second propulsion means 102, the other freewheel is idle and rotates in opposite direction. In this case, the first motion transmission system 130 preferably comprises an idler wheel 135 which is an idle wheel in both its rotation directions. Conveniently, the idler wheel 135 is operatively interposed between the two driven wheels 132, 133.

As can be seen in the figures, the transmission system 130 described above may be duplicated for the same driven shaft 134 to allow the rotation of the driven shaft 134 by means of a force applied by both the left limbs and the right limbs to the first propulsion means 101 and/or the second propulsion means 102 if the first propulsion means comprise two rotatable levers 101*a*, 101*b* and the second propulsion means comprise two crankarms 102*a*.

According to an advantageous embodiment, the first transmission system 130 is a first transmission stage and the propeller group 100 comprises a second transmission stage 136-138 for transmitting the rotary motion of the driven shaft 134 to the first propeller 5. In the particular example shown in the figures, the second transmission stage 136-138 comprises a gear wheel 136 rotationally integral with the driven shaft 134, a further drive chain or belt 137, a further gear wheel 138 which conveniently is part of, or is connected to, an angular rotary joint. The drive chain or belt 137 connects the gear wheel 136 and the gear wheel 138 to each other.

If the human powered aircraft 1 comprises at least one auxiliary propeller 6, the propeller group 100 further comprises a second transmission system 141-144 adapted to operatively connect the second propulsion means 102 to the auxiliary propeller 6. For example, the second transmission system 141-144 comprises a driving wheel 141, a chain or belt 142, and a driven wheel 143. The chain or belt 142 connects the driving wheel 141 and the driven wheel 143 to each other, thus conveniently being gear wheels. The driving wheel 141 advantageously is a freewheel supported by a support shaft 112 rotationally integral with the crankarm 102*a*. Preferably, the support shaft 112 supports the crankarm 102*a*.

According to a particularly advantageous embodiment, the second transmission system comprises a rotatable rotating shaft 144 which connects the driven wheel 143 to the auxiliary propeller 6. For example, the flexible rotating shaft 144 rotates inside a sheath, it also being flexible. Advantageously, the flexible rotating shaft 144 comprises removable connection means, e.g., a removable coupling, allowing a user to manually or automatically connect and disconnect the flexible rotating shaft 144 to/from the driven wheel 143.

In the particular example shown, the human powered aircraft 1 comprises two auxiliary propellers 6, and therefore the second transmission system 140-144 is duplicated in such an aircraft 1.

Figure 6:
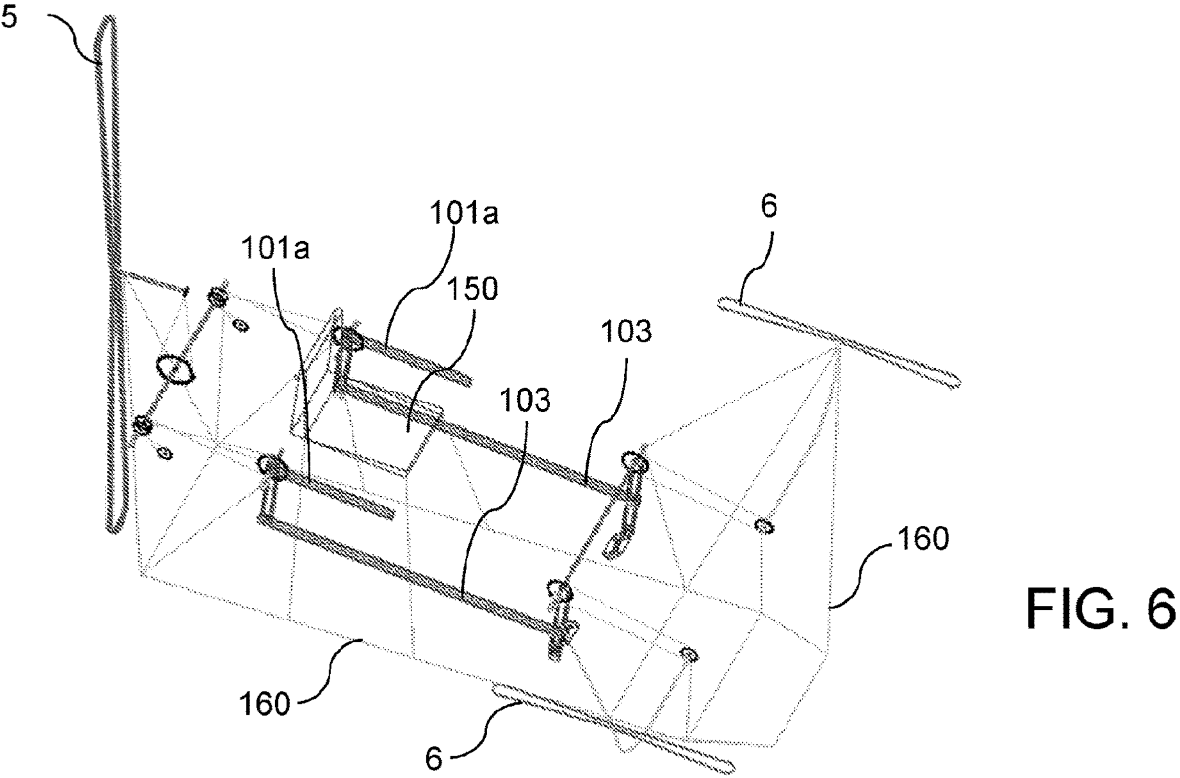
FIG. 6 shows an isometric view diagrammatically showing an example of how fastening the propeller group in FIG. 3 on a support frame which can be integrated in the structure of the aircraft in FIG. 1.

Lastly, FIG. 6 shows a non-limiting exemplary embodiment of the support frame 150 of the propeller group 100, the first propeller 5, and each possible auxiliary propeller 6, if included.

The support frame 150 can be a self-supporting frame inserted into fuselage 2, or can be partially or completely integrated in the fuselage 2. For example, the support frame can comprise tubular metal elements and/or profiled metal elements.

FIG. 6 also shows a seat 160 allowing a user to operate the first propulsion means 101 and/or the second propulsion means 102 while comfortably seated. Conveniently, such a seat 160 is accommodated in the nacelle 3 of aircraft 1.

It is apparent from the above disclosure that a human powered aircraft 1 as described above allows obviating the drawbacks of the prior art. Indeed, due to the provision of the first propulsion means 101 and the second propulsion means 102 described above, it is possible to transmit to the first propeller 5 (and possibly also to each auxiliary propeller 6 included) a much higher power as compared to human powered aircrafts operated by a conventional pedal system.

Moreover, since power can be transmitted to the first propeller 5 (and possibly also to each auxiliary propeller 6 included) with both the action of his/her lower limbs and that of his/her upper limbs, the user advantageously has different travel modes which also allow temporarily resting his/her legs or arms.

Without prejudice to the principle of the invention, the embodiments and the construction details may be broadly varied with respect to the above description merely disclosed by way of a non-limiting example, without departing from the scope of the invention as defined in the appended claims.

The invention claimed is:

1. A human powered aircraft comprising:

a fuselage in which a nacelle is defined;

at least one wing fastened to the fuselage;

at least a first propeller adapted to be moved to rotate about a first propeller axis;

a propeller group adapted and configured to be operated by a user to rotate the at least a first propeller about the first propeller axis;

wherein:

the propeller group comprises first propulsion means adapted to be moved by the user by his/her upper limbs, and second propulsion means adapted to be moved by the user by his/her lower limbs;

the first propulsion means are configured to be rotated alternatively in two opposite directions about a first rotation axis;

the second propulsion means are configured to be rotated alternatively in two opposite directions about a second rotation axis;

the propeller group comprises at least one connection arm that connects the first propulsion means and the second propulsion means to each other so that a rotation in one direction of the first propulsion means results in a rotation in the same direction of the second propulsion means, and vice versa;

the at least one connection arm comprises a rod rotatably hinged to the first propulsion means and to the second propulsion means in two hinge points, respectively, which are spaced apart from each other and which identify a first hinge axis and a second hinge axis, respectively; and the first hinge axis and the second hinge axis are parallel to each other and to the first and second rotation axes.

2. The human powered aircraft of claim 1, wherein the first rotation axis is parallel to the second rotation axis.

3. The human powered aircraft of claim 1, wherein the at least one connection arm comprises a first end portion rotatably connected to the first propulsion means and a second end portion, opposite to the first end portion, rotatably connected to the second propulsion means.

4. The human powered aircraft of claim 1, wherein the first propulsion means comprise at least one rotatable lever manually operable by the user.

5. The human powered aircraft of claim 4, wherein the at least one rotatable lever comprises a first lever portion and a second lever portion which are rotationally integral and mutually arranged to form an angle.

6. The human powered aircraft of claim 4, wherein the at least one rotatable lever is a curved lever having two mutually integral lever portions forming an elbow.

7. The human powered aircraft of claim 1, wherein the second propulsion means comprise at least one crankarm.

8. The human powered aircraft of claim 7, wherein the at least one crankarm is configured to rotate in a reciprocating manner about the second rotation axis and is rotatably hinged to the at least one connection arm.

9. The human powered aircraft of claim 1, wherein the propeller group comprises a first motion transmission system which allows converting a reciprocating rotary motion of the first propulsion means and of the second propulsion means into a continuous rotary motion of the at least a first propeller so that the at least a first propeller always rotates in a same direction about the first propeller axis.

* * * * *